United States Patent [19]

Pitchford

[11] 4,062,301
[45] Dec. 13, 1977

[54] SNAP PALLET

[76] Inventor: Peter R. Pitchford, 635 Millwood Road, Toronto, Ontario, Canada

[21] Appl. No.: 639,954

[22] Filed: Dec. 11, 1975

[30] Foreign Application Priority Data

Apr. 29, 1975 Canada .................................. 226001

[51] Int. Cl.² .......................................... B65D 19/28
[52] U.S. Cl. ..................................... 108/56.1; 52/667; 108/54.1; 403/347
[58] Field of Search .................... 108/51.1, 51.3, 52.1, 108/54.1, 56.1, 57.1; 403/346, 347, 353; 52/485, 494, 496, 664, 667, 668, 669, 758 A, 758 D, 486, 579, 588, 629, 473

[56] References Cited

U.S. PATENT DOCUMENTS

| 1,027,641 | 5/1912 | Collins | 403/347 |
|---|---|---|---|
| 2,371,921 | 3/1945 | Tucker | 52/667 |
| 2,657,437 | 11/1953 | Moser | 52/473 |
| 3,044,586 | 7/1962 | Cassels | 52/668 |
| 3,248,837 | 5/1966 | Newell et al. | 52/669 X |
| 3,540,178 | 11/1970 | Altissimo | 52/669 |
| 3,548,556 | 12/1970 | Vermeulen | 52/669 X |
| 3,602,157 | 8/1971 | Cohen | 108/57.1 X |
| 3,861,108 | 1/1975 | Hartman | 52/667 |
| 3,878,796 | 4/1975 | Morrison | 108/56.1 |
| 3,914,913 | 10/1975 | Roberts | 52/579 X |
| 3,971,326 | 7/1976 | Svirklys | 108/56.1 |

FOREIGN PATENT DOCUMENTS 648,611  1/1951  United Kingdom ................ 108/51.1

Primary Examiner—Roy D. Frazier
Assistant Examiner—William E. Lyddane
Attorney, Agent, or Firm—Rogers, Bereskin & Parr

[57] ABSTRACT

A pallet or skid is disclosed for use in material handling. The pallet, preferably formed of metal, may be rigidly assembled or disassembled without the use of welding or fasteners, or the like. The pallet has a plurality of longitudinal deck panels for horizontal parallel location to form a load bearing surface. The deck panels have longitudinal resilient edge portions defining a plurality of spaced-apart slots. A plurality of spaced-apart stringer members are provided for transversely engaging the deck members, with the deck members passing through openings in the stringer members. The stringer member openings are dimensioned to provide retaining portions, so that upon transverse deflection of the deck member edge portions, the deck members may slide through the stringer member openings until the slots register with the retaining portions causing the deck members to snap and lock into position in the stringer members.

4 Claims, 10 Drawing Figures

SNAP PALLET

This invention relates to pallets or skids for use in material handling. In particular, the invention relates to pallets having longitudinal and transverse members that snap or lock together to be assembled or disassembled without the use of additional fastening means.

Material handling pallets have been made in the past that can be partially assembled or disassembled in the field so that the pallets can be shipped in a knock down form or disassembled form when they are not being used to transport materials. These pallets typically include a load-supporting member, or members, and a plurality of detachable legs that hold the support member off the floor or the ground, so that forks of a forklift truck can be inserted under the support member to lift the pallet.

A difficulty with these pallets used in the past is that in order to be of suitable durability, the structural members have been complicated, making the pallets expensive to produce.

The present invention provides a lightweight pallet having longitudinal and transverse members that may be assembled or disassembled in the field without the use of additional fastening means.

According to one aspect of the invention there is provided a pallet comprising a plurality of longitudinal deck panels adapted to be located horizontally and parallel to form a load bearing surface. The deck panels have longitudinal edge portions defining a plurality of spaced-apart slots. The pallet also has a plurality of spaced-apart stringer members for transversely engaging the deck panels, the stringer members defining a plurality of retaining portions adapted to be engaged and be located in the slots for releasably retaining the deck members in position. Also, the deck panel edge portions are biased into locating engagement with the retaining portions so that upon transverse deflection of the edge portions, the retaining portions are disengaged from the slots to permit relative movement between the stringer and deck members.

According to another aspect of the invention, there is provided an extension for a pallet having a plurality of longitudinal horizontal deck panels. The extension comprises a plurality of horizontal parallel extension deck panels adapted to telescopically engage the pallet deck panels to form a load bearing surface. The extension deck panels have longitudinal edge portions that define a plurality of spaced-apart slots. A stringer member transversely engages the extension deck panels adjacent to one end of the panels. The stringer member defines a plurality of retaining portions adapted to be engaged and be located in the extension deck panel slots for releasably retaining the extension deck members in position. Also, the edge portions are biased into locating engagement with the retaining portions so that upon transverse deflection of the edge portions, the retaining portions disengage the slots to permit removal of the extension deck members from the stringer member.

A preferred embodiment of the invention will now be described by way of example, with reference to the accompanying drawings in which.

Figure 1:
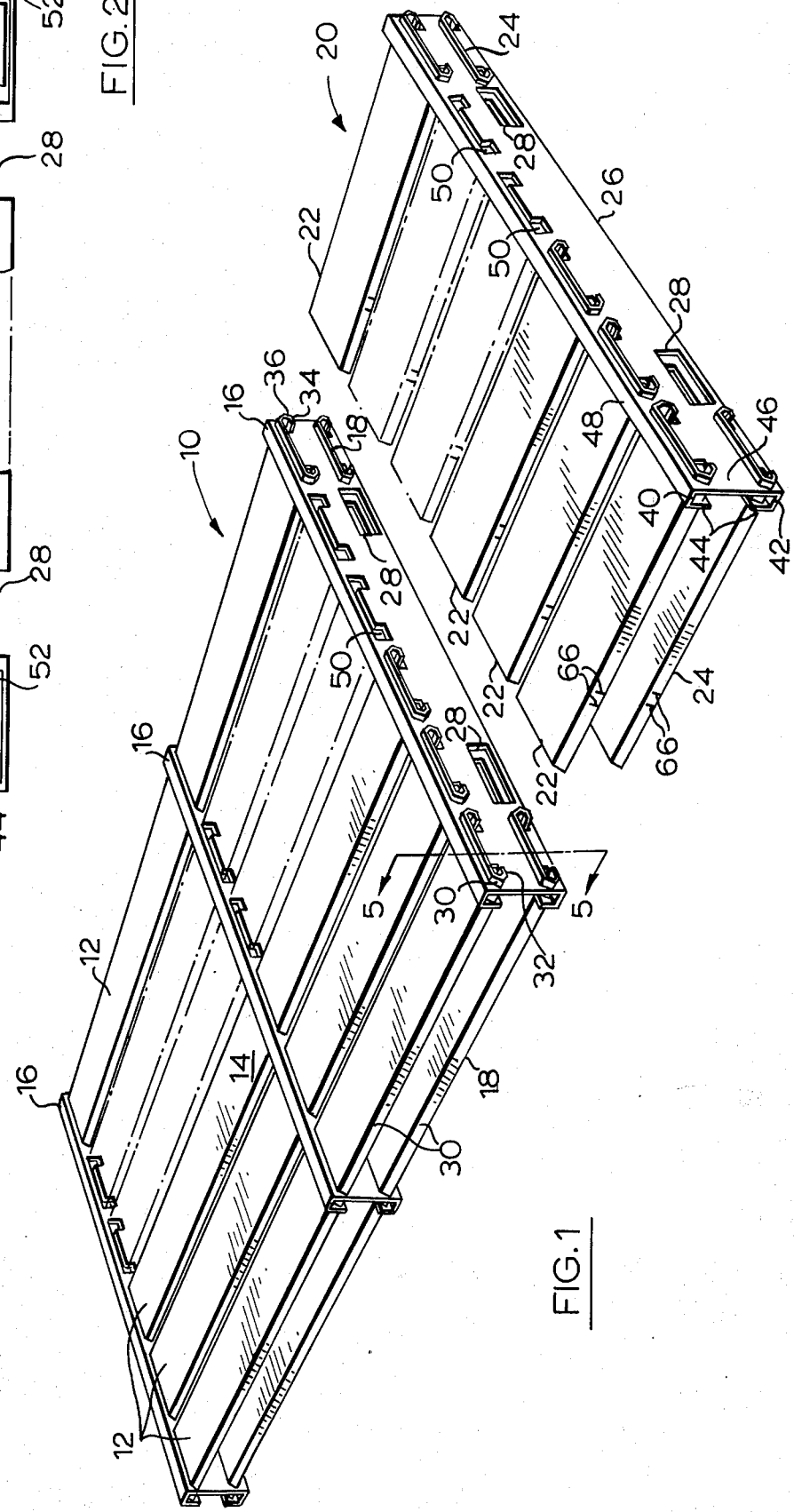
FIG. 1 is a perspective view of a snap pallet, showing in exploded position a pallet extension.

Referring firstly to FIG. 1, a preferred embodiment of a snap pallet is generally indicated by reference numeral 10. Pallet 10 has a plurality of longitudinal deck panels 12 (two of which have been omitted as indicated in FIG. 1 by chain dotted lines) which are approximately 40 inches in length. These deck panels 12 are located horizontally and parallel to form a load bearing surface 14 upon which materials may be placed to be transported on pallet 10. Three stringer members 16, approximately 48 inches in length, transversely engage and retain the deck panels in position, as will be described further below. Also, a pair of longitudinal support members 18 are spaced below deck panels 12 and extend between stringer member 16 to rigidify pallet 10.

A pallet extension 20 is shown in exploded view with respect to pallet 10. Extension 20 has a plurality of extension deck panels 22 (two of which have also been omitted) which telescopically engage or slide inside panel deck panels 12. Extension 20 also has a pair of extension support members 24 which telescopically engage or slide inside pallet support members 18. A stringer member 26 is also transversely located in extension 20 to retain and support extension deck panels 22 and extension support members 24. Pallet extension 20 telescopically slides into and out of pallet 10 so that the width of the pallet may be adjusted as desired.

When pallet 10 is assembled, forks of a forklift truck may be inserted transversely between deck panels 12 and support members 16 to lift the pallet and any material loaded thereon. As described further below, stringer members 16, 26 also have spaced-apart lower openings 28 for longitudinal entry parallel to deck panels 12, 22 of forks of a forklift truck. Lower openings 28 are located adjacent to the bottom edges of stringer members 16, 26 and are suitably dimensioned to facilitate entry of the forklift truck forks.

In the preferred embodiment of pallet 10, deck panels 12 are identical to support members 18 and stringer members 16 are identical to stringer member 26. Extension deck panels 22 are of similar cross-sectional shape to pallet deck panels 12, except that the outside dimensions of extension deck panels 22 are slightly smaller than the inside dimensions of deck panels 12, so that extension deck panels 22 are telescopically slidable inside deck panels 12, as described further below.

Figure 3:
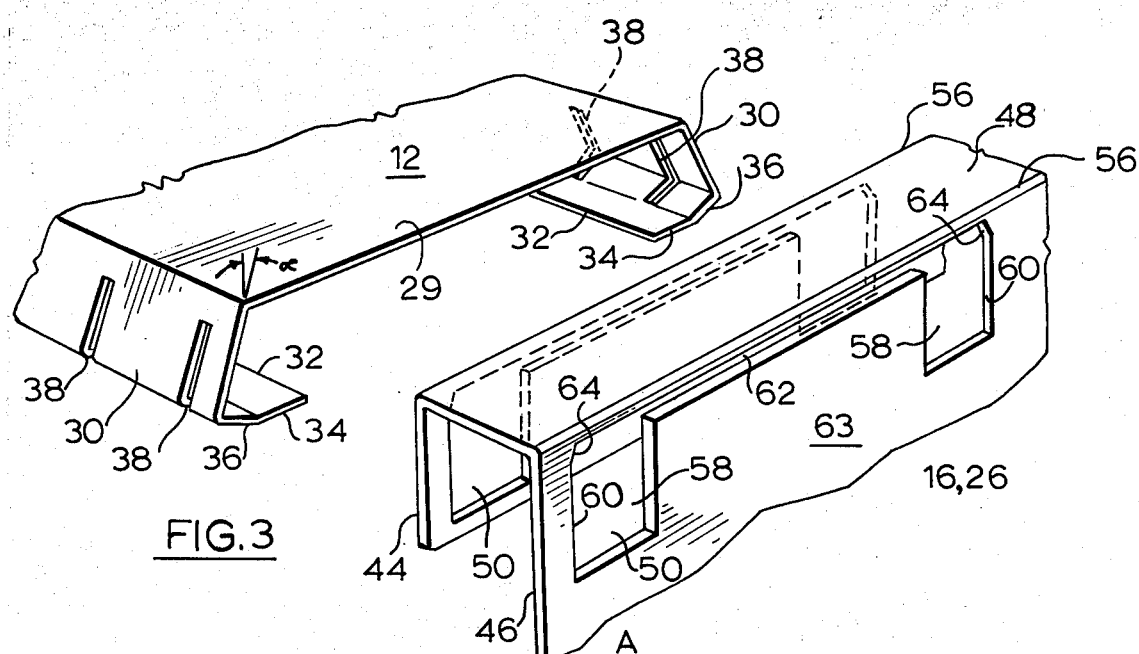
FIGS. 3, 4 and 5 are perspective views of the front upper corner of the pallet shown in FIG. 1 showing progressive stages of assembly of the pallet, FIG. 5 being taken along line 5—5 of FIG. 1.

Referring next to FIGS. 1 and 3, deck panels 12 (also support members 18) have flat portions 29, which form load bearing surface 14, and opposed longitudinal edge portions 30 which are generally downwardly and outwardly disposed, as indicated by angle $\alpha$ (FIG. 3), which is approximately 20 to 25 degrees from the vertical. Edge portions 30 include longitudinal inwardly extended ribs 32, which normally have a horizontal portion 34 and an inclined portion 36. Edge portions 30 also define a plurality of spaced-apart slots 38 which extend transversely across inclined portions 36 and partially up the downwardly and outwardly disposed edge portions 30. Slots 38 are spaced-apart to register with adjacent mating parts on stringer members 16, 26 as described below.

Deck panels 12 are formed of 22 gauge sheet metal in the preferred embodiment. Thus edge portions 30 are somewhat resilient and are biased into the position shown in FIG. 3 due to this resilience. Deck panels 12 are preferably roll formed with slots 38 punched after the roll forming operation for accurate location.

Figure 2:
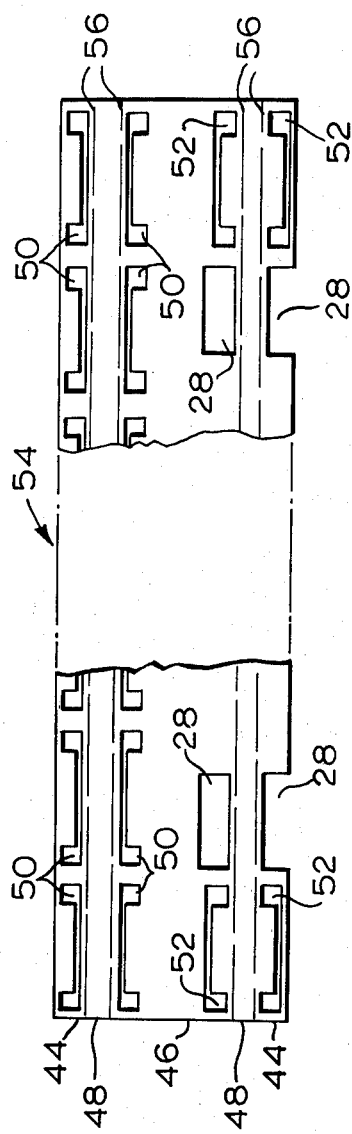
FIG. 2 is a plan view of a blank from which a stringer member is formed.

Referring next to FIGS. 1, 2 and 3, stringer members 16, 26 are shown to have an upper U-shaped portion 40 and a lower U-shaped portion 42 which form shorter vertical walls 44 and a longer vertical wall 46. Located between vertical walls 44, 46 are elongated runner portions 48. Stringer members 16, 26 are formed with 6 openings 50 which correspond with the six deck panels 12, 22. A pair of further openings 52 are located below openings 50 for passage of support members 18, 24 therethrough. As discussed above, stringer members 16, 26 also have lower openings 28 for entry of forks of a forklift truck.

Referring to FIG. 2, a blank 54 is shown from which stringer members 16, 26 are formed. In the preferred embodiment, blank is made of 14 gauge sheet metal. Openings 28, 50 and 52 are punched out of blank 54, and then the blank is bent along fold lines 56 to form the upper and lower U-shaped portions 40, 42. In fact, stringer members 16, 26 are made by roll forming, with openings 28, 50 and 52 being pre-punched before the roll forming operation.

Referring again to FIG. 3 an upper corner portion of stringer member 16, 26 is shown enlarged to better indicate the shape or dimensions of openings 50 (which are identical to openings 52). Openings 50 are located adjacent to runner portion 48, so that flat portions 29 of deck members 12 are in sliding engagement with the underside of runner portions 48 during assembly of pallet 10. Also, the openings 50 on opposed vertical walls 44, 46 are in registration to permit deck panels 12 to slide through openings 50 as will be described below.

Openings 50 are formed with opposed enlargements 58 which have outward opposed side portions forming retaining portions 60. Openings 50 also have narrow sections 62 joining enlargements 58 which permit deck panel flat portions 29 to slide through stringer members 16, 26. Enlargements 58 and narrow section 60 define a projection 63 in stringer members 16, 26 which supports the flat portion 29 of the deck panel when under load. Openings 50 also have bevelled corners 64, the purpose of which will be described below. It will be appreciated that when pallet 10 is assembled, retaining portions 60 are located in slots 38 formed in deck panels 12. Slots 38 are therefore suitably dimensioned and spaced-apart to correspond with the distance between vertical walls 44, 46 in stringer members 16, 26.

Figure 4:
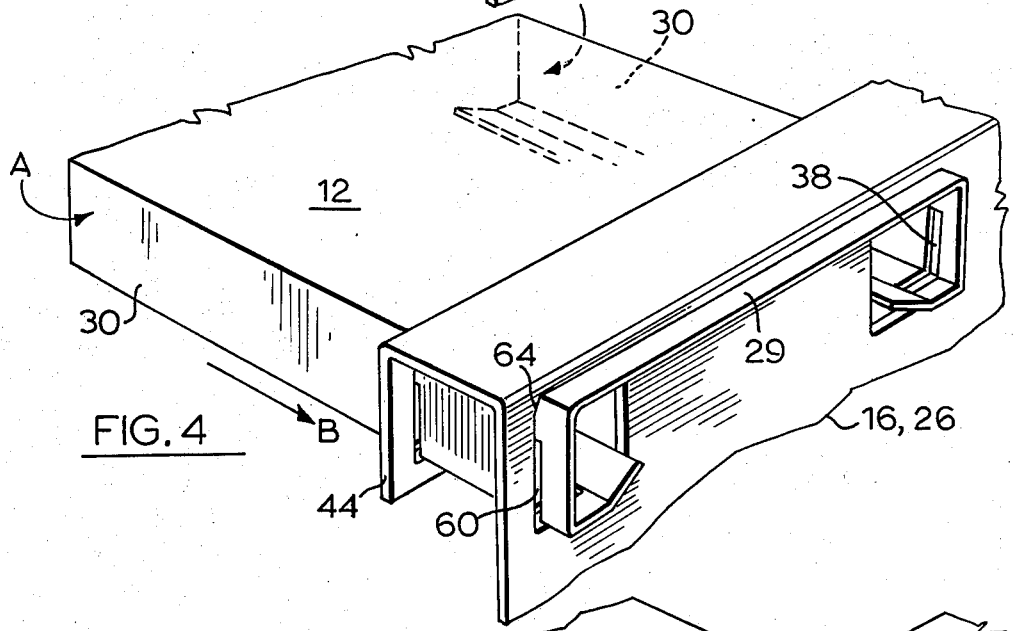
Figure 5:
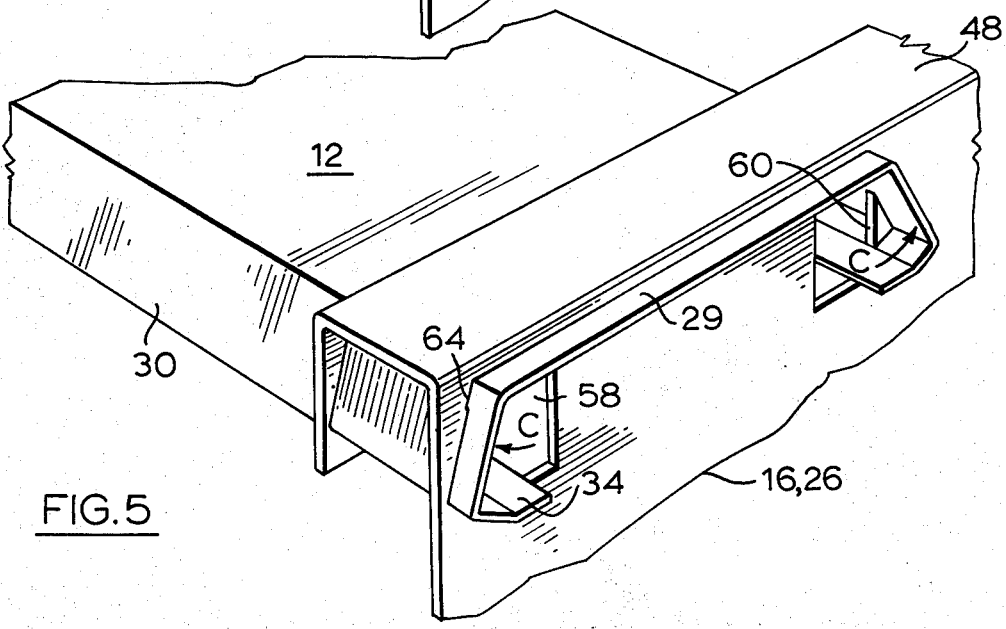

The assembly of pallet 10 will now be described with reference to FIGS. 3 to 5. Considering firstly an individual deck panel 12 and its associated opening 50 in stringer member 16, deck panel 12 is positioned opposite opening 50 as shown in FIG. 3. Edge portions 30 are then transversely and inwardly deflected in the direction of arrows A (FIG. 4) until edge portions 30 are generally vertical. Deck panel 12 is then moved in the direction of arrow B, or stringer member 16 is moved toward deck panel 12 in a direction opposite to arrow B, causing deck panel 12 to enter opening 50 in vertical wall 44. At this point, the force deflecting edge portions 30 into the vertical position may be released if desired. Deck panel 12 is then moved further in the direction of arrow B until slots 38 are in alignment with retaining portions 60, at which time edge portions 30 move transversely and outwardly in the direction of arrows C (FIG. 5) causing retaining portions 60 to be engaged by edge portions 30 and enter slots 38. In fact, due to the resilience of edge portions 30, these edge portions snap abruptly into position to securely retain or lock deck panels 12 to stringer members 16. To disassemble pallet 10, edge portions 30 are again transversely and inwardly deflected in the direction of arrows A and deck panels 12 are slid out of stringer members 16, 26 in the direction opposite to arrow B (FIG. 2).

As discussed above, openings 50 are formed with bevelled corners 64. These bevelled corners are provided to ensure that deck panels 12 fit tightly in openings 50. Also, bevelled corners 64 reduce sheer stress concentrations caused by transverse forces on deck panels 12. The angle of inclination of bevelled corners 64 is slightly less than angle $\alpha$ (FIG. 1) in order to make up for any non-elastic deformation of edge portions 30. It will be appreciated that the horizontal portions 34 of edge portions 30 exert a downward force on the bottom edges of enlargements 58. This force tends to move deck panel 12 upwardly to engage the underside of runner portion 48 of stringer members 16, 26. This upward movement also causes flat portion 29 of deck panel 12 to be centered in opening 50 due to the inwardly inclined bevelled corners 64. This centering effect caused by bevelled corners 64 absorbs any dimensional tolerance errors, thereby tending to produce a tight or snug fit between deck panel 12 and stringer members 16, 26.

The assembly of the complete pallet 10 is similar to above in that the deck panels are compressed to transversly and inwardly deflect edge portions 30. The deck panels are then slid through openings 50 until slots 38 are in alignment with the retaining portion 60 on the appropriate stringer member as shown in FIG. 1. The connections between the individual pairs of slots and the appropriate stringer member vertical walls 44, 46 can be made in any order desired, however there is a preferred method of assembly of pallet 10 as discussed next below.

The three stringer members 16 are positioned parallel and adjacent to one another and the individual deck panels 12 and support members 18 are slid through all three adjacent openings 50, 52 until the centre pair of slots 38 are in alignment with the retaining portions 60 on the centre stringer member. When all of the deck panels 12 and support members 18 are in position, the outer stringer members are separated and moved away from the centre stringer member until all three stringer members are in position. When all of the stringer members are in position, and all of the edge portions 30 have snapped into position, the assembly of pallet 10 is complete.

Pallet 10 may be assembled manually or by using a tool or jig that will transversely compress deck members 12 to deflect edge portions 30. It will be apparent to those skilled in the art that a suitable jig could be provided that would temporarily hold and compress all of the deck panels and support members while they are being inserted through the stringer members. However, such a jig is not considered to be part of the present invention and therefore will not be described further in the present specification.

Figure 6:
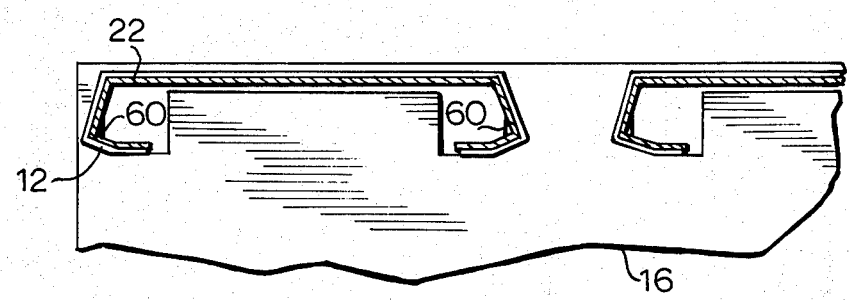
FIG. 6 is a partial end view of the pallet shown in FIG. 1, showing the pallet extension deck panels in section as telescopically engaged in the pallet deck panels.

Referring next to FIGS. 1 and 6, pallet extension 20 is shown having extension deck panels 22 which are somewhat shorter than deck panels 12 (approximately 30 inches in length in the preferred embodiment). Extension deck panels 22 are slightly smaller in outside dimensions than the inside dimensions of deck panels 12 so that extension deck panels 22 may be telescopically slid inside pallet deck panels 12 as shown in FIG. 6. Extension deck panels 22 and extension support members 24 are formed with a plurality of slots 66, so that when panels 22 and members 24 slide inside the respective panels 12 and members 18, slots 66 engage retaining portions 60 in end stringer members 16 as shown in FIG. 6. Slots 66 are spaced from the free ends of panels 22 and 24 so that these members extend approximately one foot into pallet 10 to provide adequate support for extension 22 when the pallet is being lifted.

To assemble pallet extension 20 on pallet 10, extension deck panels 22 and extension support members 24 can be transversely compressed individually and then inserted into stringer member 26, or all of these numbers can be compressed simultaneously and inserted into stringer member 26 using a suitable jig as discussed above. All of the panels 22 and support members 24 would then be transversely compressed and inserted into the respective panels 12 and support members 18 in pallet 10. Alternatively, extension deck panels 22 and support members 24 could be inserted into pallet 10 first, and then stringer member 26 could be slid onto the projecting ends of panels 22 and members 24. It will be apparent that extension 20 could be fitted onto either stringer side of pallet 10 (i.e. extension deck panels 22 could be inserted into either ends of pallet deck panels 12), and if desired, extensions 20 could be attached to both sides of pallet 10.

Figure 7:
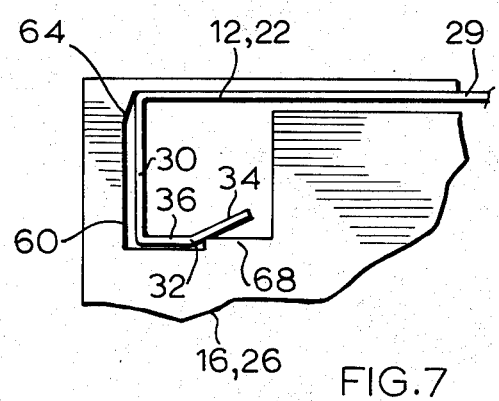
FIG. 7 and 8 are partial views of an upper corner of the pallet shown in FIG. 1, showing a modification to the openings formed in the stringer members.
Figure 8:
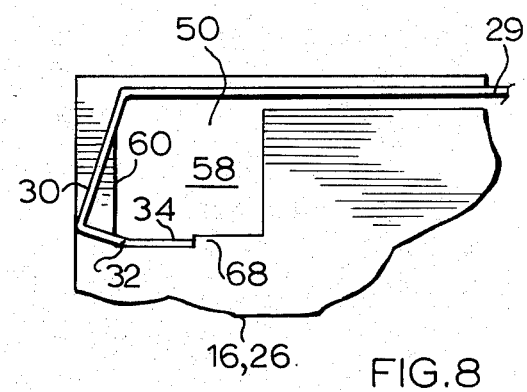

Referring next to FIGS. 7 and 8 there is shown a modification to stringer member openings 50 (also further stringer openings 52). Enlargements 58 of opening 50 define upwardly projecting tabs which engage horizontal portions 34 of ribs 32 (FIG. 8) to prevent inadvertent inward deflection of edge portions 30 when pallet 10 is assembled. As shown in FIG. 7, when edge portions 30 are deflected transversely and inwardly to permit deck panels 12 to slide in and out of stringer members 16, 26, horizontal portion 34 rides up on and slides over tab 68. However, when slots 38 are in alignment with retaining portions 60 so that edge portions 30 can snap outwardly into position, horizontal portion 34 also snaps downwardly into position to rest on the bottom edge of enlargement 58 and abut against tab 68. In order to deflect edge portions 30 inwardly to disassemble pallet 10, it is necessary to move horizontal portion 34 in an upward direction to ride over tab 68. It will be appreciated therefore, that tab 68 locks edge portion 30 more securely into position to resist inadvertent inward deflection of the edge portions. Tabs 68 also tend to prevent edge portions 30 from becoming permanently bent inwardly due to accidental deformations of edge portions 30 involving excessive force.

Figure 9:
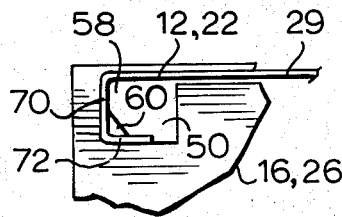
FIG. 9 is another partial view, similar to FIGS. 7 and 8, showing further modifications to the stringer member and the deck member.

Referring next to FIG. 9, a further modification of the preferred embodiment is shown. Deck panels 12, 22 as shown in FIG. 9 (similar modifications would be made to support members 18, 24 as well) have vertical edge portions 70 and inwardly extending ribs 72 that are parallel to flat portions 29. Enlargements 58 of openings 50 define retaining portions 60 in the form of lower and outer bevelled corners. Edge portions 70 are formed with slots (not shown) which are similar to slots 38 in which retaining portions 60 are located when pallet 10 is assembled. The assembly and disassembly of pallet 10, modified as shown in FIG. 9, is the same as in the preferred embodiment shown in FIGS. 1 to 6. However, edge portions 70 are transversely and inwardly deflected from the vertical position as shown in FIG. 9 until edge portions 70 clear retaining portions 60 to permit the deck members to slide in and out of stringer members 16, 26.

Figure 10:
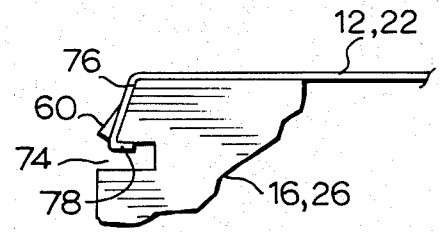
FIG. 10 is another partial view, similar to FIGS. 7 and 8, showing still further modifications of the stringer member.

Reference is next made to FIG. 10 which shows a further modification of the preferred embodiment. In the structure shown in FIG. 10 stringer members 16, 26 do not have openings for passage of deck panels 12, 22 therethrough. Rather, deck panels 12, 22 are positioned on top of (or below with respect to support members 18, 24) the stringer members. Stringer members 16, 26 are formed with recessed portions 74 that define outwardly projecting retaining portions 60. Deck panels 12, 22 have downwardly and outwardly disposed edge portions 76, which in turn have inwardly extending ribs 78 which engage the underside of retaining portions 76 to retain the deck panels in position. In this embodiment, edge portions 76 are transversely deflected outwardly to clear retaining portions 60 in order to assemble or disassemble the pallet. In addition, a pallet constructed as shown in FIG. 10 could be simply assembled by positioning deck panels 12, 22 above stringer members 16, 26 and moving the deck panels downwardly so that retaining portions 60 cause edge portions 70 to deflect outwardly until ribs 78 pass below retaining portions 60 causing edge portions 76 to snap inwardly into position.

If desired, the embodiment shown in FIG. 10 could be further modified by making recessed portions 74 part of an enlargement of an opening in a manner similar to the openings 50 shown in FIGS. 1 to 9. In this case, deck panels 12, 22 and support members 18, 24 would still be assembled and disassembled by being inserted in these openings, but edge portions 76 would be transversely deflected outwardly rather than inwardly as in the embodiment shown in FIGS. 1 to 9.

It will be appreciated that the downwardly and outwardly disposed edge portions 30 on the deck panels 12 and support members 18 of the preferred embodiment provide a bevelled edge on these members. This bevelled edge facilitates entry of forks on forklift trucks and similar hand operated lifting and material handling equipment. The downwardly and outwardly disposed edge portion 30 also provides a stronger structure in that any upward lifting force exerted on the underside of deck panels 12 tends to cause edge portions 30 to deflect further outwardly thereby making a tighter joint structure.

Having described a preferred embodiment and some modifications to the preferred embodiment, it will be apparent that still further alterations and modifications may be made to pallet 10. For example, each of the deck panels and support members could be provided with only one longitudinal edge portion rather than two opposed parallel edge portions as in the preferred embodiment. Bevelled corners 64 (FIG. 3) could be eliminated if desired. Instead of having six deck panels and three stringer members, fewer deck panels and more stringer members or any convenient combination of these two different members could be used. It may also be possible that panel 10 could be constructed from material other than metal.

Panel extension 20 could be provided with more than one set of slots 66 so that the extension could be located in different positions. Also, slots 66 could be eliminated and retaining portions 60 (FIG. 6) could be notched so that extension 20 could slide freely in a longitudinal direction with respect to pallet 10. Thus, the width of pallet 10 would be continuously adjustable within the length of the extension deck panels and support members. Further, additional extensions could be connected to the first extension or extra long or double extensions could be used having more than one extension stringer member 26.

What I claim as my invention is:

1. A pallet comprising:
   a. a plurality of longitudinal deck panels adapted to be located horizontally and parallel to form a load bearing surface, the deck panels having longitudinal edge portions defining a plurality of spaced-apart slot openings therein, said edge portions further including longitudinal transversely extending ribs;
   b. a plurality of spaced-apart stringer members having transverse openings therethrough, the deck members being adapted to pass through said stringer openings upon transverse deflection of said longitudinal edge portions, the periphery of said stringer openings defining retaining portions adapted to be located in said slot openings for releasably retaining the deck members in position;
   c. said edge portions being biased towards said retaining portions; and
   d. the peripheries of said stringer openings also defining projecting tabs for resisting inadvertent transverse deflection of said edge portions, the tabs being located generally opposite the retaining portions and adapted to engage said ribs when said retaining portions are located in said slot openings, so that upon transverse deflection of said edge portions away from said retaining portions and tabs the retaining portions are disengaged from said slot openings to permit relative movement between the stringer and deck members.

2. A snap pallet as claimed in claim 1 wherein the peripheries of said stringer openings also define downwardly and outwardly bevelled upper corners for engagement with adjacent upper corners of the deck panels.

3. A pallet comprising:
   a. a plurality of longitudinal deck panels adapted to be located horizontally and parallel to form a load bearing surface, the deck panels having longitudinal edge portions defining a plurality of spaced-apart slot openings therein, said edge portions further including longitudinal transversely extending ribs;
   b. a plurality of spaced-apart stringer members having transverse openings therethrough, the deck members being adapted to pass through said stringer openings upon transverse deflection of said longitudinal edge portions, the periphery of said stringer openings defining retaining portions adapted to be located in said slot openings for releasably retaining the deck members in position;
   c. said edge portions being downwardly and outwardly disposed and biased toward said retaining portions, so that upon transverse deflection of said edge portions away from said retaining portions the retaining portions are disengaged from said slot openings to permit relative movement between the stringer and deck members; and
   d. the peripheries of said stringer openings also defining downwardly and outwardly bevelled upper corners for engagement with adjacent upper corners of the deck panels.

4. A pallet as claimed in claim 3 wherein the periphery of said stringer openings also define projecting tabs for resisting inadvertent transverse deflection of said edge portions, the tabs being located generally opposite said retaining portions and adapted to engage said ribs when said retaining portions are located in said slot openings.

* * * * *